US007990356B2

(12) United States Patent
Chung et al.

(10) Patent No.: US 7,990,356 B2
(45) Date of Patent: Aug. 2, 2011

(54) FLAT PANEL DISPLAY HAVING A COMPENSATION CIRCUIT TO COMPENSATE A DEFECTIVE PIXEL

(75) Inventors: In Jae Chung, Gwachoen-si (KR); Soon Sung Yoo, Gunpo-si (KR); Seung Hee Nam, Suwon-si (KR); Deuk Su Lee, Yongin-si (KR); Jong Hee Hwang, Osan-si (KR)

(73) Assignee: LG Display Co., Ltd., Seoul (KR)

( * ) Notice: Subject to any disclaimer, the term of this patent is extended or adjusted under 35 U.S.C. 154(b) by 933 days.

(21) Appl. No.: 11/479,172

(22) Filed: Jun. 30, 2006

(65) Prior Publication Data

US 2007/0126460 A1 Jun. 7, 2007

(30) Foreign Application Priority Data

Dec. 2, 2005 (KR) ........................ 10-2005-0117064

(51) Int. Cl.
*G09G 3/36* (2006.01)
*G02F 1/1343* (2006.01)

(52) U.S. Cl. ............................... 345/98; 345/93; 349/55

(58) Field of Classification Search .............. 345/76–83, 345/87–104; 324/770; 349/192, 54–55
See application file for complete search history.

(56) References Cited

U.S. PATENT DOCUMENTS 5,132,819 A * 7/1992 Noriyama et al. .............. 349/55
5,343,216 A * 8/1994 Katayama et al. .............. 345/92
6,259,424 B1 * 7/2001 Kurogane ........................ 345/93
2005/0156852 A1 * 7/2005 Kwon ............................. 345/98
2007/0063940 A1 * 3/2007 Juenger ........................... 345/87

FOREIGN PATENT DOCUMENTS

JP 09-179532 7/1997
JP 11-072805 3/1999
JP 2001-075523 3/2001

OTHER PUBLICATIONS

Office Action issued in corresponding Japanese Patent Application No. 2006-168220; issued Mar. 29, 2010.

* cited by examiner

*Primary Examiner* — Bipin Shalwala
*Assistant Examiner* — Keith Crawley
(74) *Attorney, Agent, or Firm* — Brinks Hofer Gilson & Lione

(57) ABSTRACT

A flat panel display, a fabricating method thereof, a fabricating apparatus thereof, a picture quality controlling method thereof and a picture quality controlling apparatus for reducing a recognizing degree of a defective pixel and electrically compensating a charging characteristics of the defective pixel are provided.

In the flat panel display, a display panel has a plurality of pixels. A defective pixel is electrically connected to an adjacent normal pixel. A memory stores a location data that indicates a location of the link pixel and a compensation data that compensates for charging characteristics of the link pixel. A compensation circuit modulates a digital video data to be displayed on the link pixel on the basis of the location data and the compensation data.

10 Claims, 20 Drawing Sheets

FLAT PANEL DISPLAY HAVING A COMPENSATION CIRCUIT TO COMPENSATE A DEFECTIVE PIXEL

This application claims the benefit of Korean Patent Application No. P2005-0117064 filed in Korea on Dec. 2, 2005, which is hereby incorporated by reference.

BACKGROUND

1. Field

A flat panel display, and more particularly a flat panel display, a fabricating method thereof, a fabricating apparatus thereof, a picture quality controlling method thereof and a picture quality controlling apparatus are provided.

2. Related Art

Recently, display devices have become increasingly popular as a visual information communicating media in information society. Cathode Ray Tubes were conventionally used but have a heavy weight and a bulky volume. Various flat panel display devices have been developed that can overcome the limit of such a cathode ray tube.

Such flat panel displays include, for example, a liquid crystal display (LCD), a field emission display (FED), a plasma display panel (PDP) and an organic light emitting diode (OLED). Most of these devices are put to practical use and put on the market.

The flat panel displays include a display panel for displaying a picture, and a defective pixel has been found in a test process in the display panel. The defective pixel is generated by a shorting and an opening of a signal wire line, a defect of a thin film transistor (hereinafter "TFT") or a defect of an electrode pattern. The defective pixel found in a test process is displayed as a brightness spot in a normally white mode such that a transmittance of a liquid crystal cell is lower as it increases a data voltage applied to the liquid crystal cell.

The defective pixel displayed as the brightness spot is darkened in a repairing process. FIG. 1 shows a condition that the darkened defective pixel 10 is recognized at a middle gray scale level and a white gray scale level. Referring to FIG. 1, the darkened defective pixel 10 is hardly recognized in a black gray scale level, but is recognized as a dark spot in a middle and white gray scale level by a naked eye.

SUMMARY OF THE INVENTION

Accordingly, it is an object of the present invention to provide a flat panel display, a fabricating method thereof, a fabricating apparatus thereof, a picture quality controlling method thereof and a picture quality controlling apparatus.

A flat panel display comprises a display panel that has a plurality of data lines and a plurality of scan lines that cross each other. A plurality of pixels is arranged. A defective pixel is electrically connected to a normal pixel adjacently with thereof. A memory stores location data that indicate a location of a link pixel and a compensation data that compensates for charging characteristics of the link pixel. A compensation circuit modulates a digital video data displayed on the link pixel on the basis of the location data and the compensation data.

A normal pixel adjacent to the defective pixel displays the same color as a color displayed by the defective pixel.

The compensation data is set in accordance with a gray scale of a data to be displayed at the link pixel.

The flat panel display further includes a plurality of switch devices formed at an area defined by an intersection between the data lines and the scan lines to supply a data signal from the data line to pixels that includes the link pixel.

A current path between the defective pixel and the switch device is shorted.

The flat panel display further includes a data drive circuit that converts a digital video data modulated by the compensation circuit and a un-modulated digital video data into an analog data signal to supply to the data lines. A scan drive circuit supplies a scan signal to the scan lines. The data drive circuit supplies the digital video data to the data drive circuit. A timing controller controls the scan drive circuit.

The compensation circuit is integrated within the timing controller.

The memory includes EEPROM or EDID ROM.

The compensation circuit increases and decreases the compensation data into a digital video data to be displayed at the link pixel.

The display panel is either a display panel of a liquid crystal display device or a display panel of an organic light emitting diode.

A method of fabricating a flat panel display according to another aspect of the present invention comprises the acts of supplying a test data and a test scan signal to the data electrodes of the flat panel display in the inspection process of the flat panel display to inspect an existence or nonexistence of a defective pixel in the flat panel display; electrically connecting a normal pixel adjacently with the defective pixel to the defective pixel to form a link pixel; measuring a charging characteristics of the link pixel; determining a location data for indicating a location of the link pixel and a compensation data for compensating a charging characteristics of the link pixel; and storing the location data and the compensation data into a data modulation memory of the flat panel display in a compensation data recording process of the flat panel display.

In the method, a normal pixel adjacent with the defective pixel displays the same color as a color displayed by the defective pixel.

In the method, the compensation data is set in accordance with a gray scale of a data to be displayed at the link pixel.

In the method, the memory includes a nonvolatile memory that is adaptive for renewing a data.

In the method, the memory includes EEPROM or EDID ROM.

The method further comprises modulating a digital video data displayed at the link pixel by using a location data and a compensation data stored at the memory.

In the method, said flat panel display includes a plurality of switch devices formed in an area by intersection between the data lines and the scan lines to supply a data signal from the data line to pixels including the link pixel.

The act of forming the link pixel includes shorting a current path between the defective pixel and the switch device; and electrically connecting a pixel electrode of the defective pixel separated from by an insulating film, to a pixel electrode of a normal pixel adjacently with thereof by using a W-CVD process.

The act of forming the link pixel includes forming a link pattern that overlaps at least a portion of the link pattern with a pixel electrode of the defective pixel and a pixel electrode of a normal pixel adjacently with thereof with having an insulating film therebetween at a display panel of the flat panel display; shorting a current path between the defective pixel and the switch device; and radiating a laser into each side of the link pattern to electrically connect a pixel electrode of the defective pixel separated by an insulating film, from a pixel electrode of a normal pixel adjacently with thereof by the medium of the link pattern.

The link pattern is formed with the scan line on the same layer as the scan line.

The link pattern is connected to the scan line.

The method of fabricating the flat panel display further includes disconnecting the link pixel and the scan line from each other.

The link pattern is formed with the data line on the same layer as the data line.

A fabricating apparatus of a flat panel display according to another aspect of the present invention comprises an inspection device supplies a test data and a test scan signal to the data electrodes of the flat panel display in the inspection process of the flat panel display to inspect an existence or nonexistence of a defective pixel in the flat panel display. A repair device electrically connects a normal pixel adjacently with the defective pixel to the defective pixel to form a link pixel. An electric charging compensation device determines a compensation data compensating a charging characteristics of the link pixel on the basis of the charging characteristics of the link pixel, that determines a location data that indicates a location of the link pixel and storing the location data and the compensation data into a data modulation memory of the flat panel display.

A method of controlling a picture quality of a flat panel display according to other embodiment in the method of controlling the picture quality of the flat panel display panel having a link pixel such that a plurality of data lines and a plurality of scan lines are cross each other, a plurality of pixels are arranged, and a defective pixel is electrically connected to a normal pixel adjacently with thereof, comprises the steps of storing a location data for indicating a location of the link pixel and a compensation data for compensating a charging characteristics of the link pixel into a memory; and modulating the location data and a digital video data to be displayed at the link pixel on the basis of the location data and the compensation data.

A picture quality controlling apparatus of a flat panel display according to another embodiment, in the method of controlling the picture quality of the flat panel display panel having a link pixel such that a plurality of data lines and a plurality of scan lines are crossed each other, a plurality of pixels are arranged, and a defective pixel is electrically connected to a normal pixel adjacently with thereof, comprises a memory that stores a location data that indicates a location of the link pixel and a compensation data for compensating a charging characteristics of the link pixel into a memory. A compensation circuit that modulates the location data and a digital video data to be displayed at the link pixel on the basis of the location data and the compensation data.

DRAWINGS

A detailed description of the embodiments will be provided with reference to the accompanying drawings, in which.

DETAILED DESCRIPTION OF THE PREFERRED EMBODIMENT

Hereinafter, the preferred embodiments will be described in detail with reference to FIG. 2 to FIG. 20.

Figure 1:
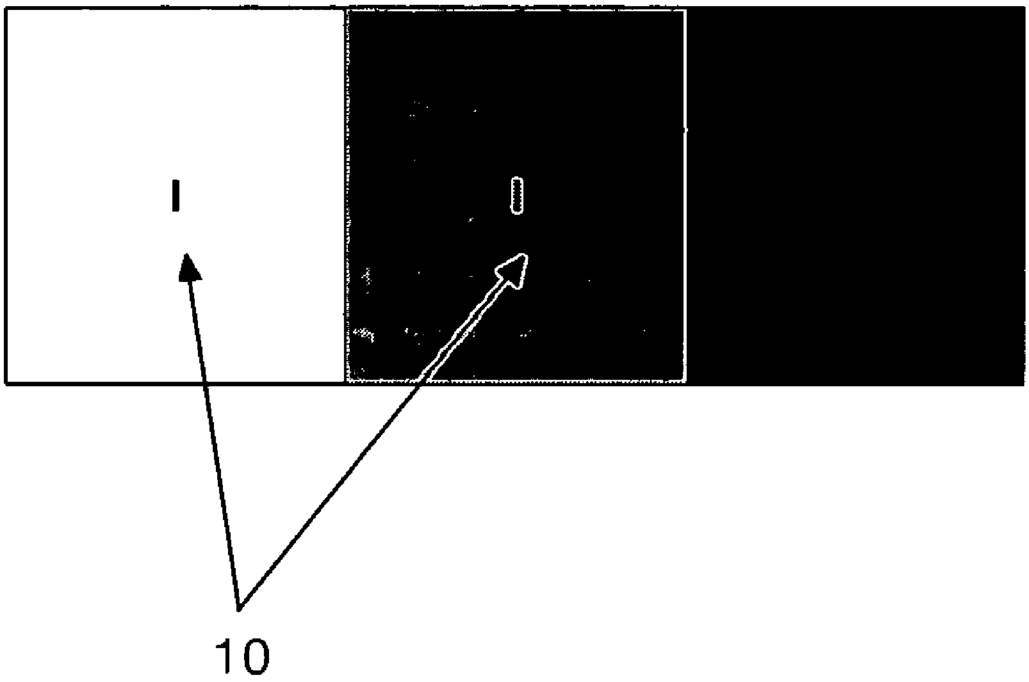
FIG.1 RELATED ART
FIG. 1 is a diagram that shows a recognizing degree of a defective pixel in each gray scale level when a defective pixel is darkened according to the related art.
Figure 2:
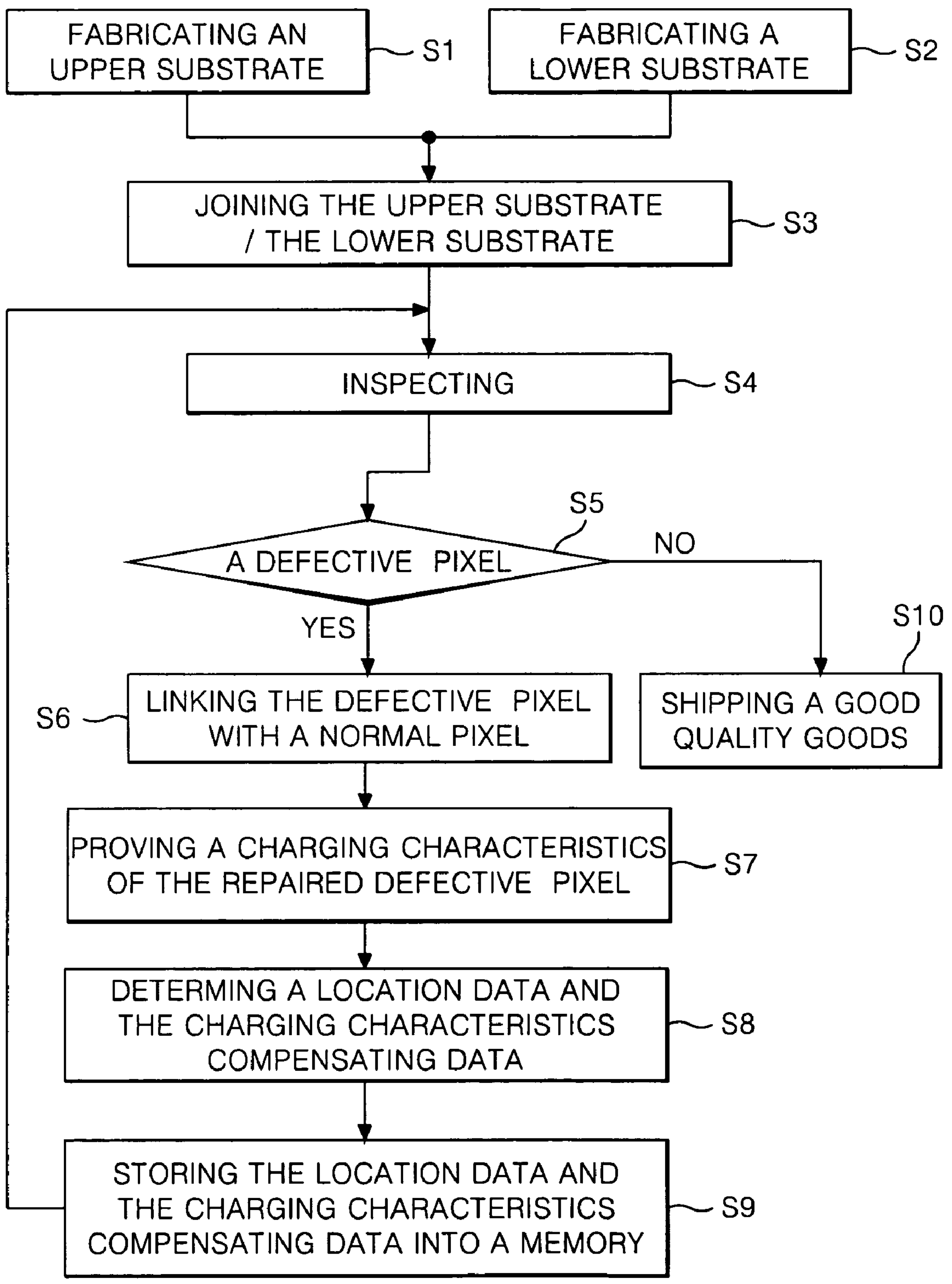
FIG. 2 is a flow chart that shows a method of fabricating a flat panel display according to an embodiment.
Figure 3:
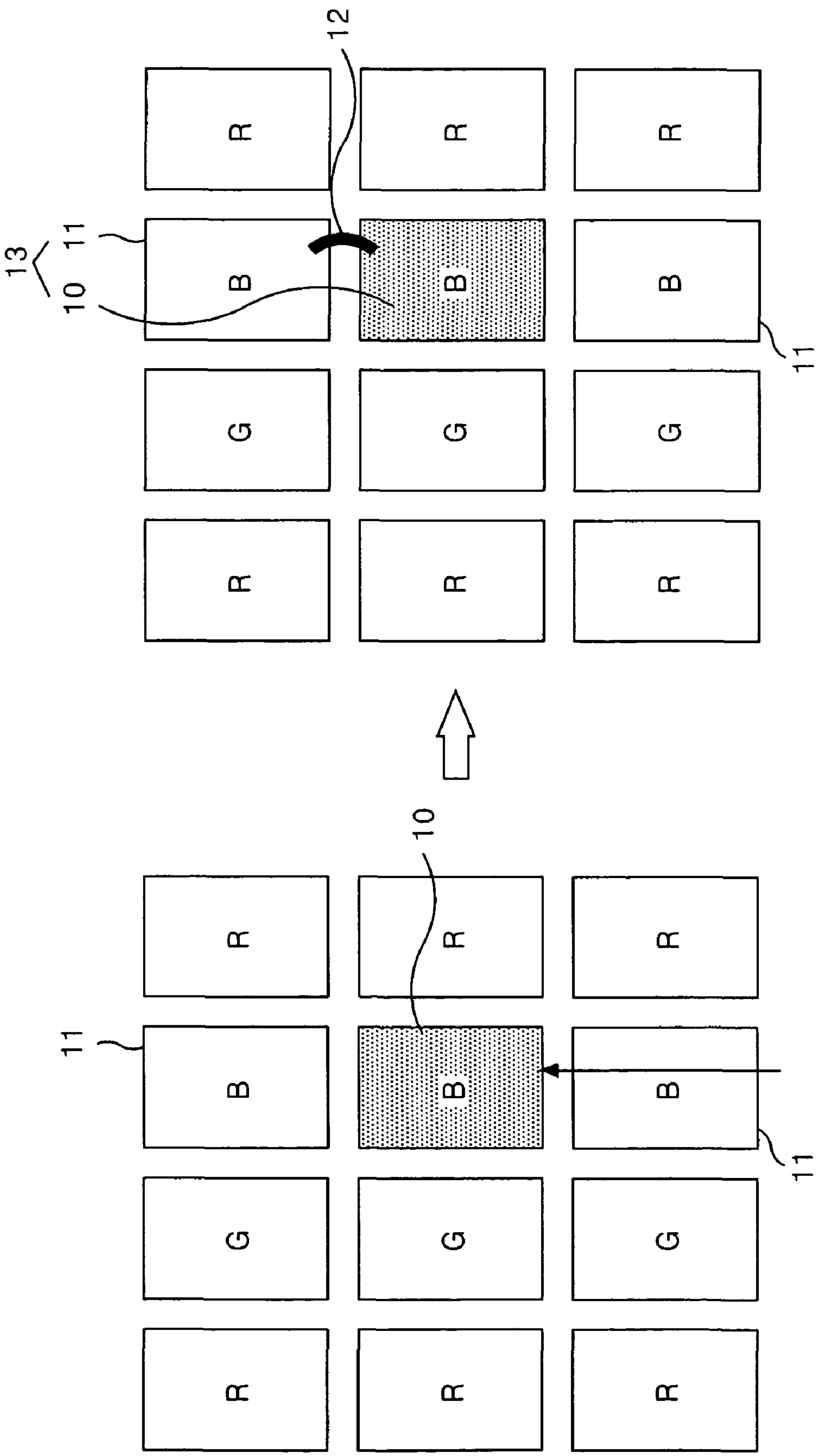
FIG. 3 is a diagram that schematically explains a repairing process according to the first embodiment.

Referring to FIG. 2 and FIG. 3, in the method of fabricating the flat panel display according to the embodiment of the present invention, an upper substrate and a lower substrate for a flat display panel are manufactured, respectively. The upper/the lower substrates are sealed by a sealant or a frit glass S1, S2 and S3.

A test data of each gray scale level is applied to a flat panel display in the inspection process to display a test picture and a defective pixel is inspected by an electrical inspection and/or macrography on the picture in an inspection process of the flat panel display S4. If the defective pixel is found on the flat panel display in the inspection process S5, a normal pixel 11 that has the same color and the defective pixel 10 are linked or shorted into a conductive link pattern 12 to allow the same signal to be supplied to a normal pixel and a defective pixel S6.

A defective pixel linked with a normal pixel is applied with a test voltage to measure a charging characteristics of the linked normal pixel and the defective pixel (hereinafter, referred to as "link pixel"). The measured value is compared with a charging characteristics of the non-linked normal pixel to prove a charging characteristics of a link pixel 13 S7.

Referring to FIG. 3, the defective pixel 10 linked upon charging of a data voltage of the normal pixel 11 linked at the link pixel 13 in which the normal pixel having the same color and the defective pixel are electrically connected in the repairing process charges the same data voltage. An electric charge is supplied, via one thin film transistor, to the pixel electrodes included in two pixels. The charging characteristics of the link pixel 13 in comparison to the non-linked normal pixel 11 are differentiated. For example, if the same data voltage is supplied to the link pixel 13 and the non-linked normal pixel 11, the electric charge is dispersed into two pixels. Thus, the link pixel 13 in comparison to the non-linked normal pixel 11 has a smaller electric charge.

When the same data voltage is supplied to the non-linked normal pixel 11 and the link pixel 13, then the link pixel 13 in comparison to the non-linked normal pixel 11 is brighter in a normally white mode in which a transmittance or a gray scale increases as it decreases the data voltage. When the same data voltage is supplied to the non-linked normal pixel 11 and the link pixel 13, then the link pixel 13 in comparison to the non-linked normal pixel 11 is darker in a normally black mode in which a transmittance or a gray scale increases as it increases the data voltage.

Generally, a twisted nematic mode (hereinafter, referred to as "TN mode") such that a pixel electrode and a common electrode of the liquid crystal cell are separately formed on the two substrates opposed to each other with having the liquid crystal therebetween to apply a vertical electric field between the pixel electrode and the common electrode, is driven by the normally white mode while an in-plane switching mode (hereinafter, referred to as "IPS mode") such that a pixel electrode. A common electrode of the liquid crystal cell are formed on the same substrate to apply a horizontal electric field between the pixel electrode and the common electrode, is driven by the normally black mode.

In the step S7 and S8, the method of fabricating the flat panel display evaluates a location of the normal pixel 11 included in the link pixel 13 as a coordinate value to determine a location data indicating the coordinate value. The method determines a charging compensation data that compensates a charging characteristics of the link pixel 13. A location data of the normal pixel 11 included in the link pixel 13 and the charging compensation data is stored into a nonvolatile memory. For example, the nonvolatile memory may be an EEPROM (Electrically Erasable Programmable Read Only Memory) that is adaptive for renewing and removing a data, or EDID ROM (Extended Display Identification Data ROM) in the compensation data recording process. In general, the charging characteristics of the link pixel 13 are differentiated from each gray scale level. The charging compensation data is differentiated from each gray scale level or each gray scale area that includes a plurality of gray scales to allow the link pixel 13 to have the same gray scale expressive ability as a gray scale expressive ability of the normal pixel each gray scale, to be profitable.

The method of fabricating the flat panel display modulates a digital video data to be supplied to the link pixel 13 by using the location data stored in the EEPROM or EDID ROM and the charging compensation data. The modulated data is supplied to the flat panel display to display a picture, and then again inspects the picture.

If the size, number and degree of display stain such as a defective pixel and extra panel defect, are found to be not greater than an allowable reference value for a good product in the step S5, the flat panel display is considered a good product to be shipped S10.

A method of fabricating the liquid crystal display device is divided into a substrate cleaning process, a substrate patterning process, an alignment film forming/rubbing process, a substrate joining/liquid crystal injecting process, a mounting process, an inspection process, and a repairing process.

In the substrate cleaning process, impurities with which the substrate surface of the liquid crystal display device is contaminated are removed with a cleaning solution.

The substrate patterning process is divided into a pattering process of an upper plate (color filter substrate) and a patterning process of a lower plate (TFT array substrate). For example, color filters, a common electrode, and a black matrix, are formed in the substrate of the upper plate. In the substrate of the lower plate, signal wire lines such as data lines and gate lines are formed. A TFT is formed at the intersection between the data lines and the gate lines, and a pixel electrode is formed at a pixel area between the gate line and the data line connected to a source electrode of the TFT.

In the alignment film forming/rubbing process, an alignment film is coated on each of the upper and lower plates and the alignment film is rubbed with a rubbing cloth.

In the substrate joining/liquid crystal injecting process, the upper substrate and the lower substrate are joined together by use of a sealant. Liquid crystal and spacers are injected through a liquid crystal injection hole, and then the liquid crystal injection hole is sealed off.

In the mounting process, a tape carrier package (hereinafter, referred to as "TCP") on which integrated circuits (hereinafter, referred to as "IC") such as a gate drive IC and a data drive IC are mounted is connected to a pad part on the substrate. The drive IC might be mounted directly on the substrate by a chip-on-glass (COG) method other than a tape automated bonding (TAB) method using the foregoing TCP.

The inspection process includes an electrical inspection carried out after the various signal wire lines and the pixel electrode are formed in the lower substrate. An electrical inspection and a macrography is carried out after the substrate bonding/liquid crystal injecting process. As the result of the inspection process carried out after the substrate joining/liquid crystal injecting process, if the defective pixel 10 is found to be greater than an allowable reference value, the lower substrate before the substrate bonding/liquid crystal injecting process or a panel after the substrate bonding/liquid crystal injecting process is returned to the repairing process to allow the defective pixel 10 to be electrically connected to the normal pixel 11 having the same color adjacently with thereof.

After the charging characteristics on the link pixel 13 linked in the repairing process is inspected, a location data of the normal pixel 11 included in the link pixel 13 and the charging compensation data are determined to store the data at the EEPROM. The EEPROM is mounted on a printed circuit board PCB of the liquid crystal display. A compensation circuit that modulates a digital video data corresponding to the link pixel 13 by using the data of the EEPROM. A data drive circuit supplies the data modulated by the compensation circuit to a data drive circuit and a timing controller that controls an operation timing of a scan drive circuit are mounted together on the printed circuit board.

The compensation circuit can be embedded in the timing controller. The drive circuit of the liquid crystal display which is judged as a final good product to be shipped includes the EEPROM and the compensation circuit along with the timing controller, the data drive circuit and the scan drive circuit.

FIG. 4 to FIG. 14 are diagrams that show a variety of embodiments forming the link pattern 13 in the repairing process.

Figure 4:
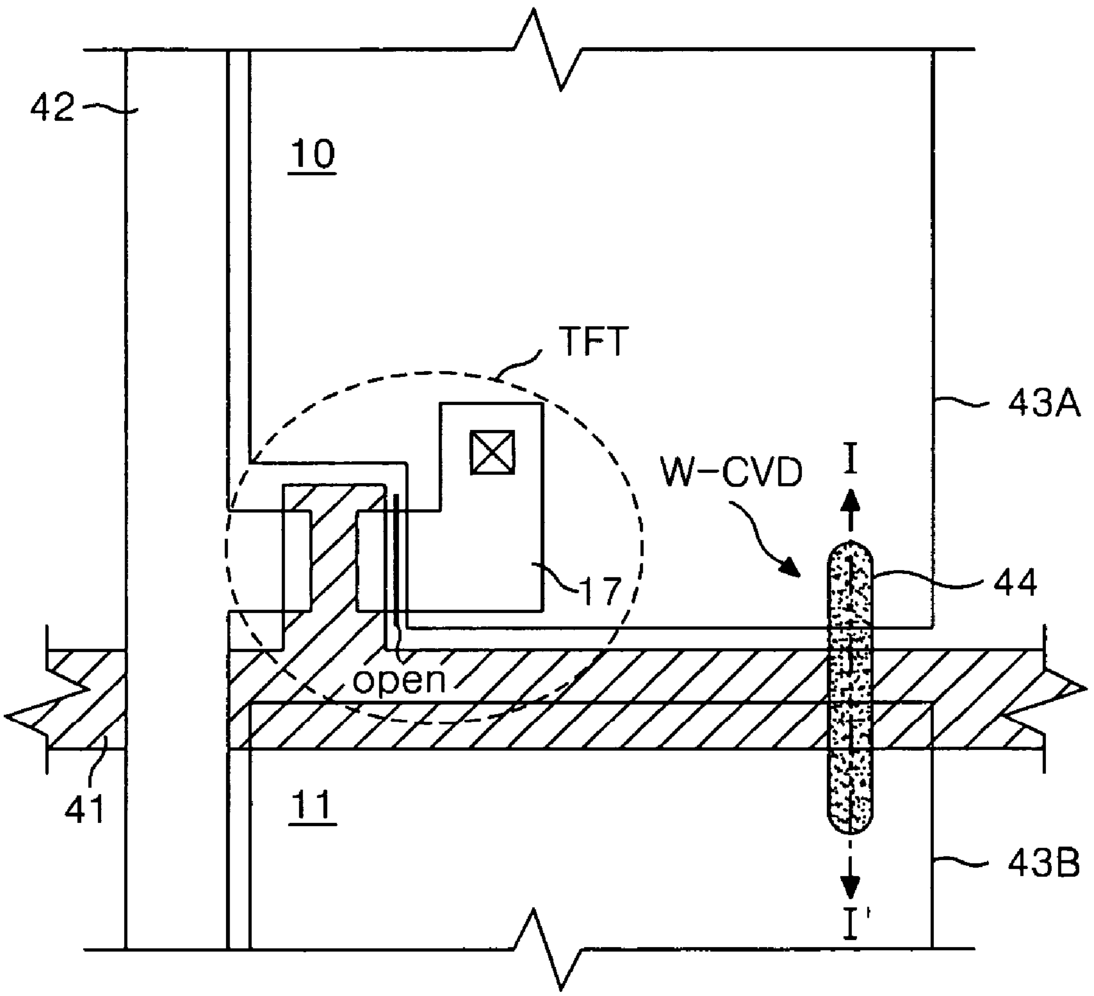
FIG. 4 is a plan view that shows an adjacent defective pixel and a normal pixel that have the same color in order to explain a repairing process according to a first embodiment.
Figure 5:
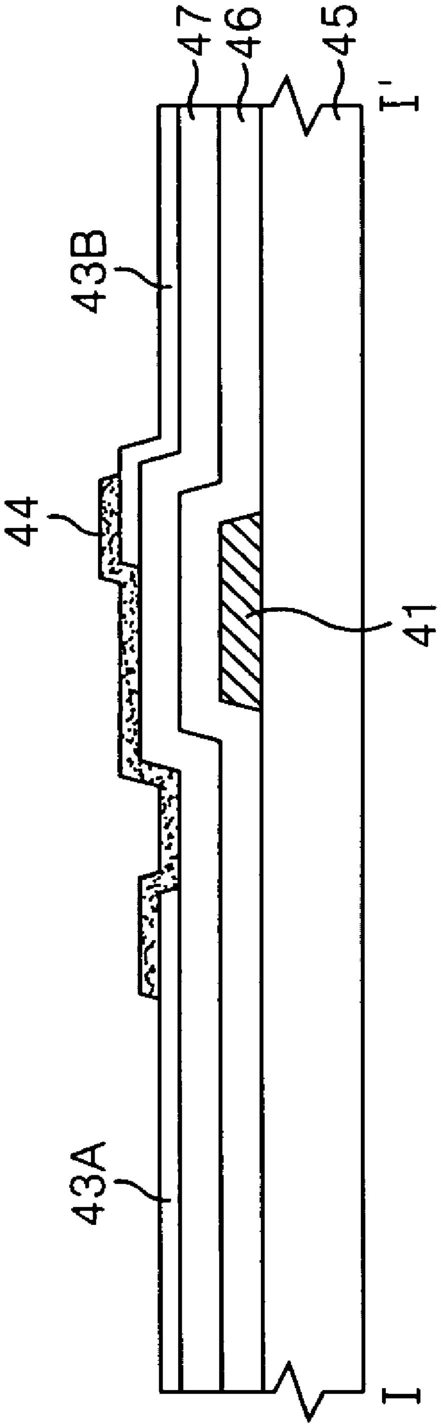
FIG. 5 is a sectional view that shows a defective pixel and a normal pixel that have the same color and are adjacent taken along the I-I' lines in FIG. 4 after the repairing process.

FIG. 4 and FIG. 5 are diagrams that explain a repairing process of a TN mode liquid crystal display device according to the first embodiment of the present invention.

Referring to FIG. 4 and FIG. 5, in the repairing process, a link pattern 44 is directly formed on the a pixel electrode 43A of the adjacently defective pixel 10 and a pixel electrode 43B of the normal pixel 11 by using the W-CVD (Chemical Vapor Deposition) process.

A gate line 41 and a data line 42 cross each other on a glass substrate 45 of a lower substrate and a TFT is formed at an intersection thereof. A gate electrode of the TFT is electrically connected to the gate line 41 and a source electrode is electrically connected to the data line 42. A drain electrode of the TFT is electrically connected, via a contact hole, to the pixel electrodes 43A and 43B.

A gate metal pattern includes the gate line 41 and the gate electrode of the TFT formed on the glass substrate 45 by a gate metal deposition process such as aluminum Al, or AlNd, a photolithography process and an etching process.

A source/drain metal pattern including the data line 42 and the source/drain electrodes of the TFT, is formed on a gate insulating film 46 by a source/drain metal deposition process such as a Chrome Cr, a molybdenum Mo, a Titanium Ti, the photolithography process and the etching process.

The gate insulating film 46 that electrically insulates the gate metal pattern and the source/drain metal pattern is formed of an inorganic insulating film such as a SiNx or a SiOx. A protective film that covers the TFT, the gate line 41 and the data line 42 is formed of the inorganic insulating film or an organic insulating film.

The pixel electrodes 43A and 43B are formed on a protective film 47 by a process that deposits a transparent conductive metal such as an Indium Tin Oxide ITO, a Tin Oxide TO, an Indium Zinc Oxide IZO or an Indium Tin Zinc Oxide ITOZ, the photolithography process or the etching process. A data voltage from the data line 42 is supplied, via the TFT, to the pixel electrodes 43A and 43B during a scanning period which the TFT is turned-on.

The repairing process is carried out on the lower substrate before the substrate joining/liquid crystal injecting process. A current path between the source electrode of the TFT and the data line 42 or a current path between the drain electrode of the TFT and the pixel electrode 43A is opened by a laser cutting process in order to shield a current path between the TFT of the defective pixel and the pixel electrode 43A. The link pattern 44 is disposed on the pixel electrode 43A of the defective pixel 10 and the pixel electrode 43B of the normal pixel 11 having the same color adjacently with thereof. A tungsten W is directly disposed on the protective film 47 between the pixel electrodes 43A and 43B by using the W-CVD process. A procedure of an opening process and the W-CVD process may be changed.

Figure 6:
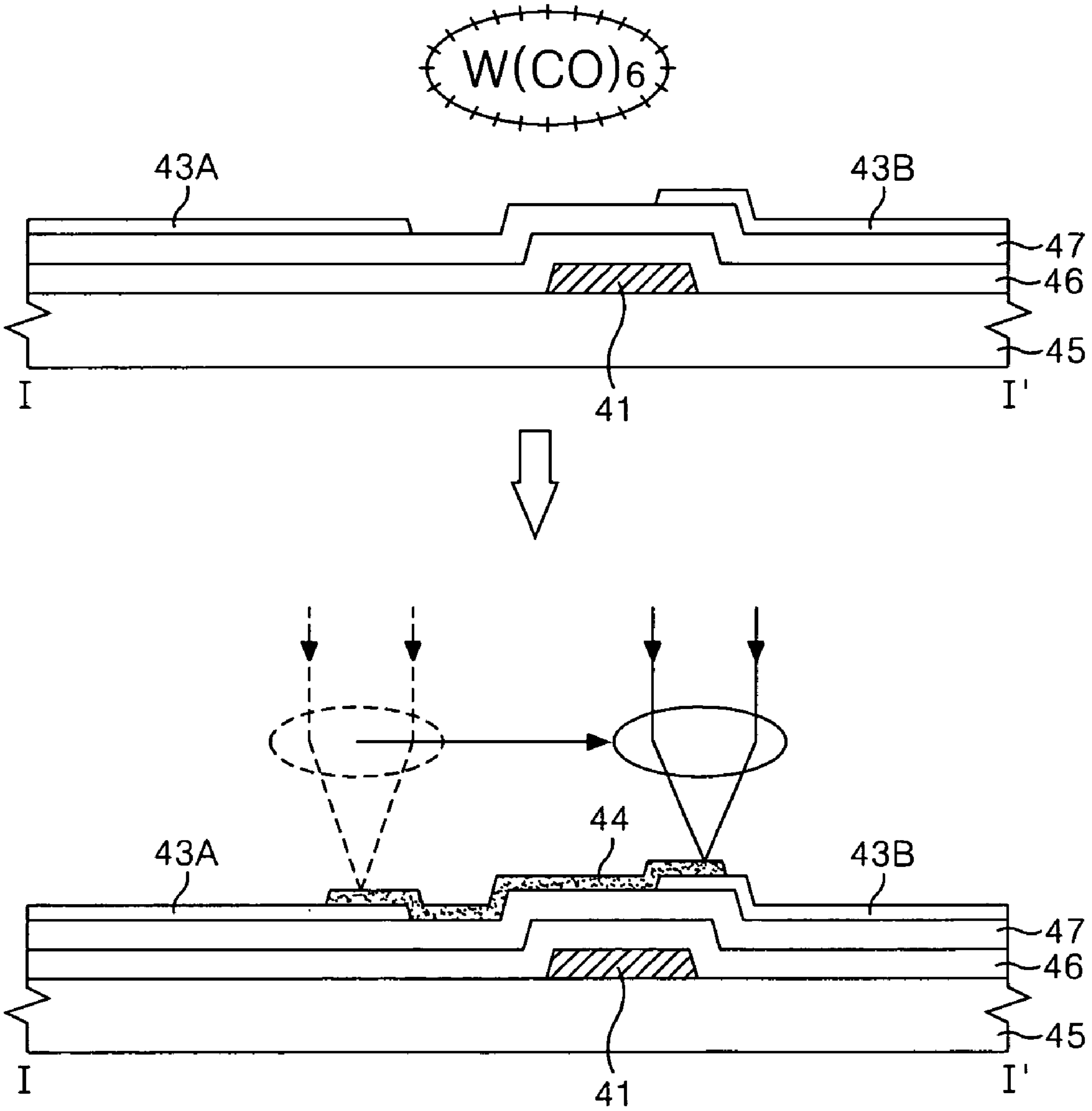
FIG. 6 is a sectional view that shows a W-CVD process in the repairing process according to the first embodiment.

Referring to FIG. 6, the W-CVD process condenses a laser beam a pixel electrode of the pixel electrodes 43A or 43B on the condition of a W(CO)6 to allow the condensed laser beam to be moved or scanned forward another pixel electrode. The tungsten W is separated from the W(CO)6 in accordance with the laser beam. The tungsten W moves forward an edge pixel electrode 43A, the protective film 47 and another edge pixel electrode 43B along a scanning direction of the laser beam to dispose on the protective film 47 between the pixel electrodes 43A and 43B and thereof.

Figure 7:
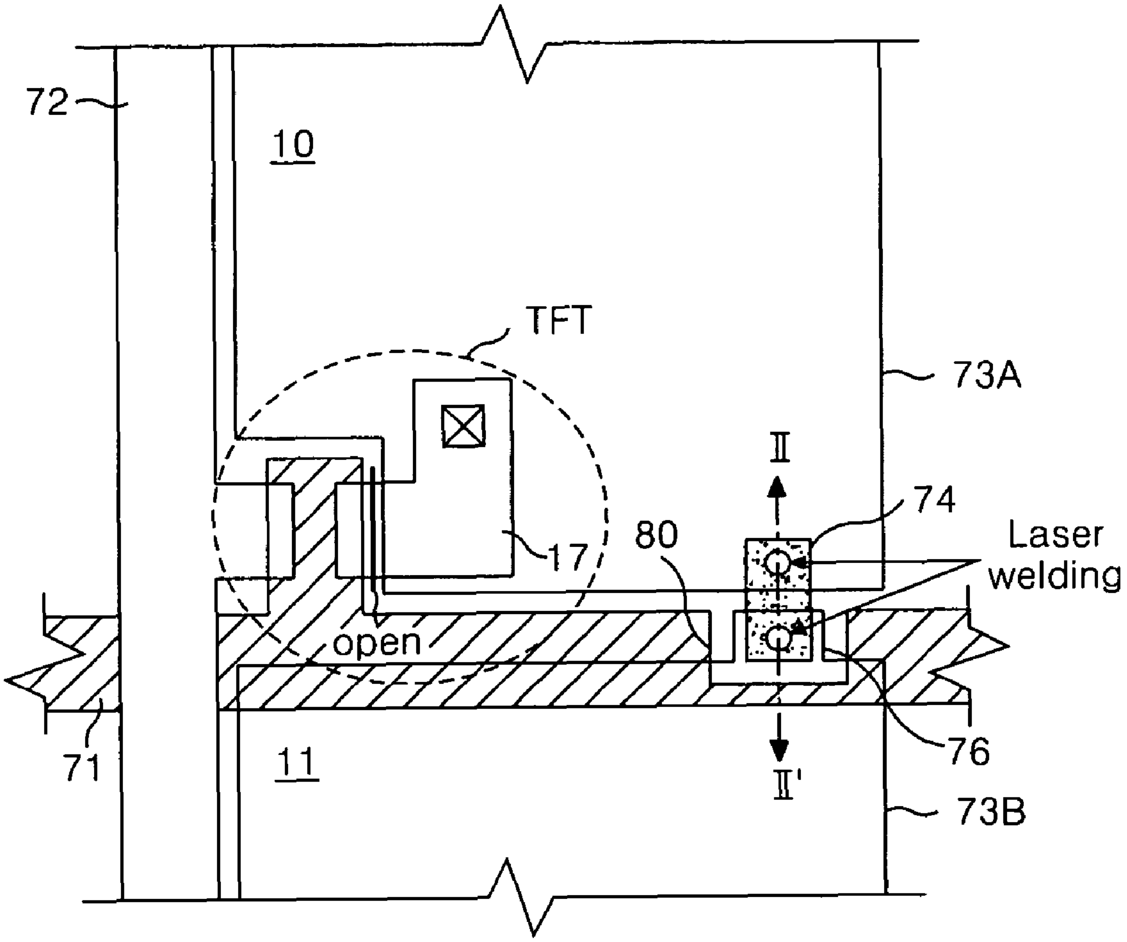
FIG. 7 is a plan view that shows a defective pixel and a normal pixel having the same color and are adjacent in order to explain a repairing process according to a second embodiment.
Figure 8:
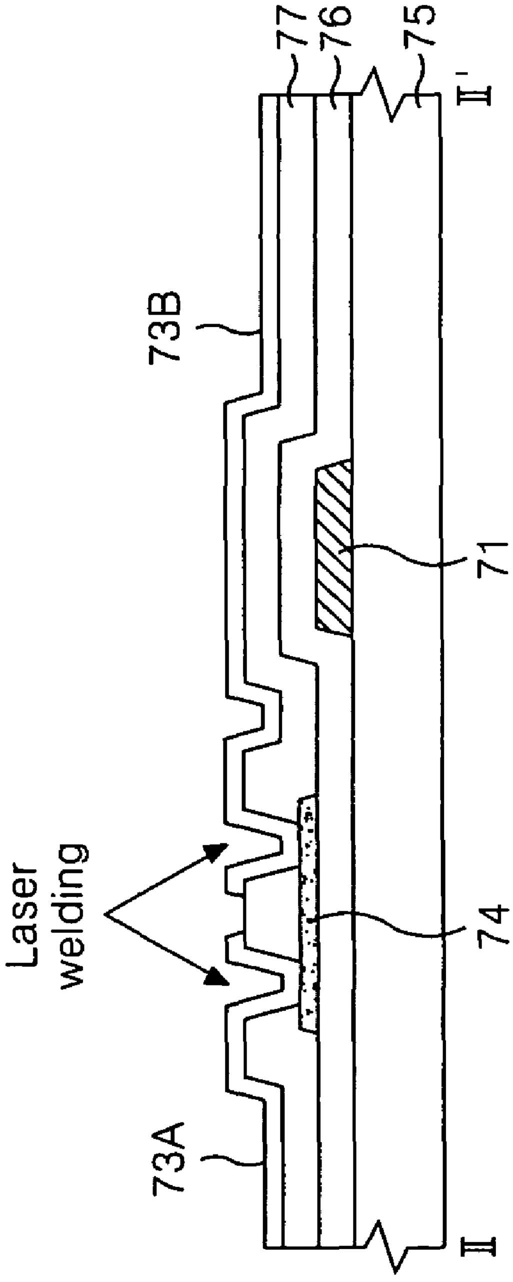
FIG. 8 is a sectional view that shows a defective pixel and a normal pixel that have the same color and are adjacent taken along the II-II' lines in FIG. 7 after the repairing process.

FIG. 7 and FIG. 8 are diagrams for explaining a repairing process of a TN mode liquid crystal display device according to the second embodiment of the present invention.

Referring to FIG. 7 and FIG. 8, the repairing process includes a link pattern 74 that overlaps with a pixel electrode 73A of the defective pixel 10 and a pixel electrode 73B of the normal pixel 11 adjacently with thereof with having a protective film 77 therebetween.

A gate line 71 and a data line 72 cross each other on a glass substrate 75 of a lower substrate and a TFT is formed at an intersection thereof. A gate electrode of the TFT is electrically connected to the gate line 71 and a source electrode is electrically connected to the data line 72. A drain electrode of the TFT is electrically connected, via a contact hole, to the pixel electrodes 73A and 73B.

A gate metal pattern that includes the gate line 71 and the gate electrode of the TFT is formed on the glass substrate 75 by a gate metal deposition process, a photolithography process and an etching process.

The gate line 71 is spaced in such a manner to have a designated distance with the link pattern 74 in order not to overlap with the link pattern 74 and includes a concave pattern 75 enclosing the link pattern 74.

A source/drain metal pattern including the data line 72, the source/drain electrodes of the TFT and the link pattern 74, is formed on a gate insulating film 76 by a source/drain metal deposition process, the photolithography process and the etching process.

The link pattern 74 is formed in an island pattern not connected to the gate line 71, the data line 72 and the pixel electrodes 73A and 73B. Both edges of the link pattern 74 overlap with the pixel electrodes 73A and 73B adjacently in the vertical direction to connect to the pixel electrodes 73A and 73B in a laser welding process.

The gate insulating film 76 electrically insulates the gate metal pattern and the source/drain metal pattern. The protective film 77 electrically insulates the source/drain metal pattern and the pixel electrodes 73A and 73B.

The pixel electrodes 73A and 73B are formed on the protective film 77 by a process disposing a transparent conductive metal, the photolithography process and the etching process. The pixel electrodes 73A and 73B include an extending portion extended from the edge of the upper portion. The pixel electrodes 73A and 73B overlap with an edge of the link pattern 74 by the extending portion 76. A data voltage from the data line 72 is supplied, via the TFT, to the pixel electrodes 73A and 73B during a scanning period which the TFT is turned-on.

The repairing process is carried out on the lower substrate before the substrate joining/liquid crystal injecting process or on a panel after the substrate joining/liquid crystal injecting process. A current path between the source electrode of the TFT and the data line 72 or a current path between the drain electrode of the TFT and the pixel electrode 73A is opened by a laser cutting process in order to shield a current path between the TFT of the defective pixel and the pixel electrode 73A.

Figure 9:
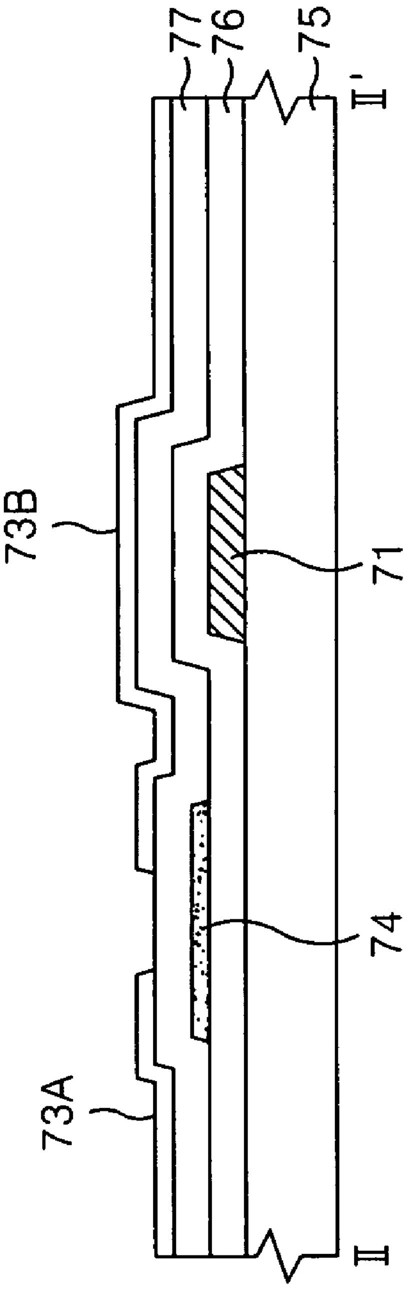
FIG. 9 is a sectional view that shows a defective pixel and a normal pixel having the same color and are adjacent taken along the II-II' lines in FIG. 7 before the repairing process.

The repairing process radiates a laser into the pixel electrodes 73A and 73B adjacently with each other at both edges of the link pattern 74 shown in FIG. 8. The pixel electrodes 73A and 73B and the protective film 77 are melted by the laser beam. The pixel electrodes 73A and 73B are connected to the link pattern 74. A procedure of an opening process and a laser welding process may be changed. FIG. 9 shows the pixel electrodes 73A and 73B electrically separated by the protective film 77 and the link pattern 74 before the laser welding process.

Figure 10:
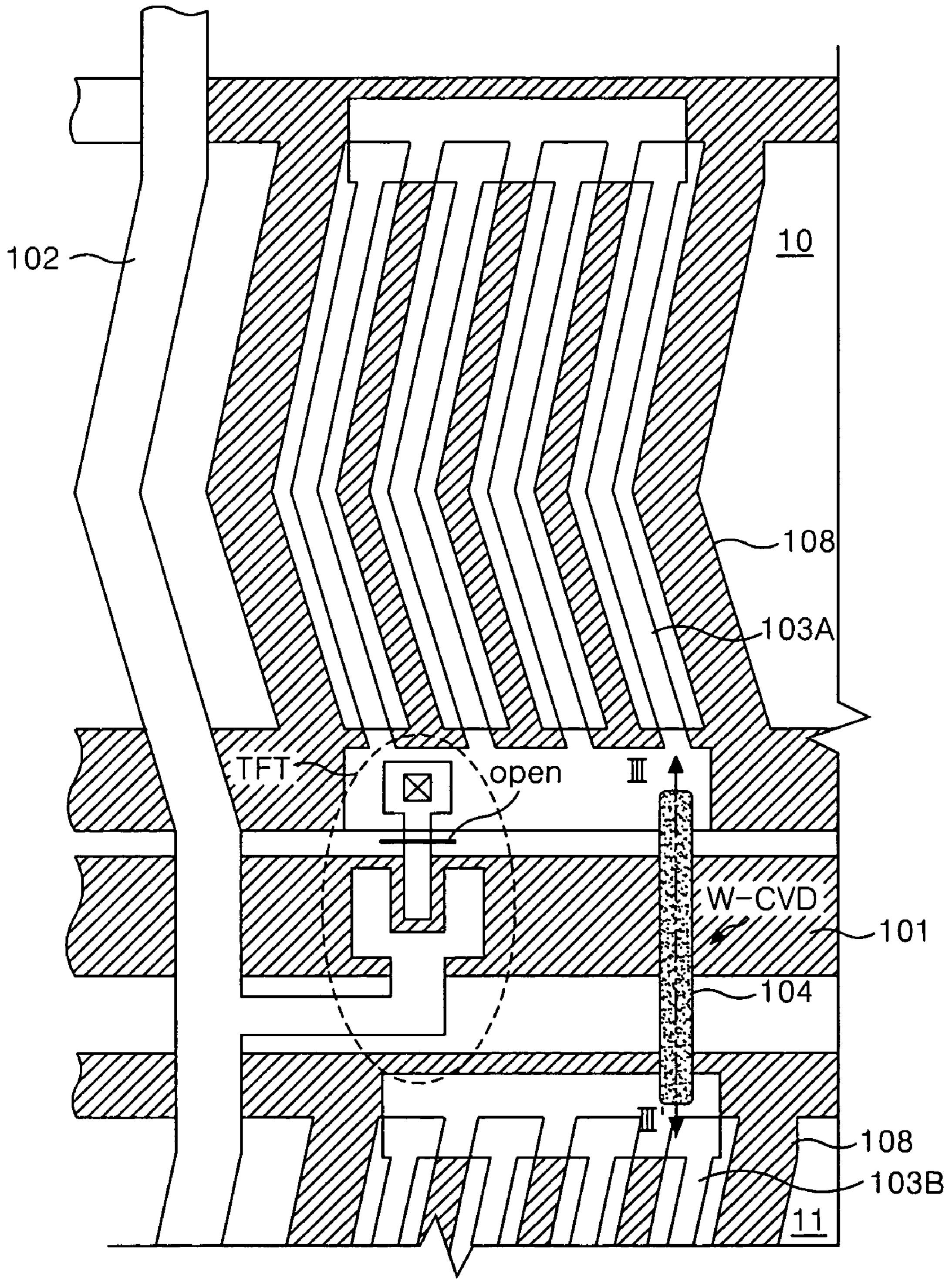
FIG. 10 is a plan view that shows a defective pixel and a normal pixel that have the same color and are adjacent in order to explain a repairing process according to a third embodiment.
Figure 11:
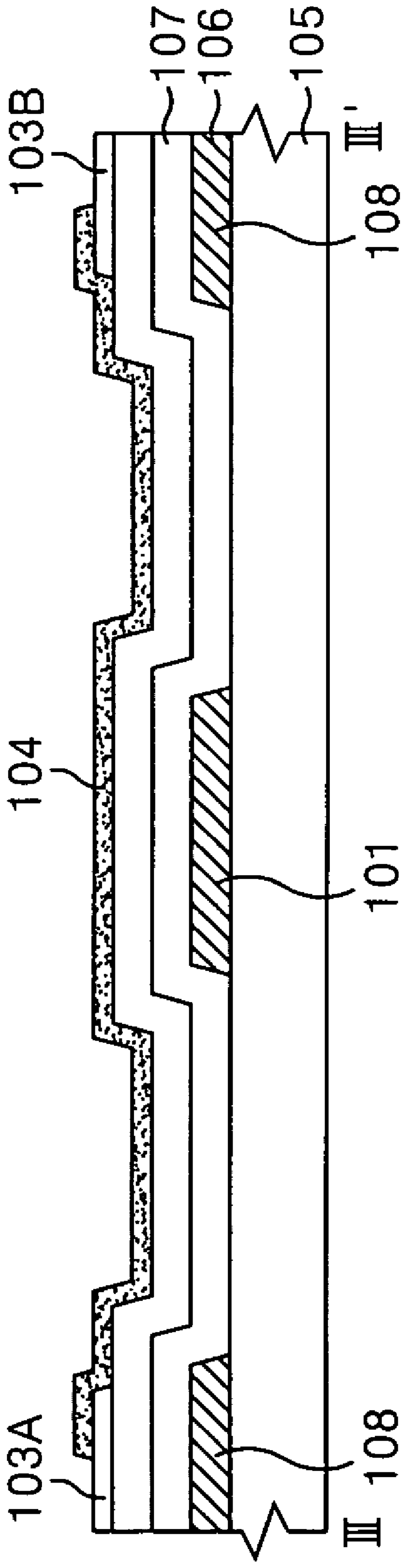
FIG. 11 is a sectional view that shows a defective pixel and a normal pixel that have the same color and are adjacent taken along the III-III' lines in FIG. 10 after the repairing process.

FIG. 10 and FIG. 11 are diagrams that explain a repairing process of an IPS mode liquid crystal display device according to the third embodiment of the present invention.

Referring to FIG. 10 and FIG. 11, in the repairing process a link pattern 104 is directly formed on a pixel electrode 103A of the adjacent defective pixel 10 and a pixel electrode 103B of the normal pixel 11 by the W-CVD (Chemical Vapor Deposition) process.

A gate line 101 and a data line 102 cross each other on a glass substrate 105 of a lower substrate and a TFT is formed at an intersection thereof. A gate electrode of the TFT is electrically connected to the gate line 41 and a source electrode is electrically connected to the data line 42. A drain electrode of the TFT is electrically connected, via a contact hole, to the pixel electrodes 103A and 103B.

A gate metal pattern that includes the gate line 101, the gate electrode of the TFT and a common electrode 108 is formed on the glass substrate 105 by the gate metal deposition process, the photolithography process and the etching process. The common electrode 108 is connected to all liquid crystal cells to apply a common voltage Vcom to the liquid crystal cells. A horizontal electric field is applied to the liquid crystal cells by the common voltage Vcom applied to the common electrode 108 and a data voltage applied to the pixel electrodes 103A and 103B.

A source/drain metal pattern that includes the data line 102 and the source/drain electrodes of the TFT, is formed on a gate insulating film 106 by the source/drain metal deposition process, the photolithography process and the etching process.

The pixel electrodes 103A and 103B are formed on the protective film 107 by a process that disposes the transparent conductive metal, the photolithography process and the etching process. A data voltage from the data line 102 is supplied, via the TFT, to the pixel electrodes 103A and 103B during a scanning period which the TFT is turned-on.

The repairing process is carried out on the lower substrate before the substrate joining/liquid crystal injecting process. A current path between the source electrode of the TFT and the data line 102 or a current path between the drain electrode of the TFT and the pixel electrode 103A is opened by a laser cutting process in order to shield a current path between the TFT of the defective pixel 10 and the pixel electrode 103A.

The link pattern 44 is directly disposed on the pixel electrode 103A of the defective pixel 10 and the pixel electrode 103B of the normal pixel 11 has the same color adjacently with thereof and a tungsten W is directly disposed on the protective film 107 between the pixel electrodes 103A and 103B by using the W-CVD process. A procedure of an opening process and the W-CVD process may be changed.

Figure 12:
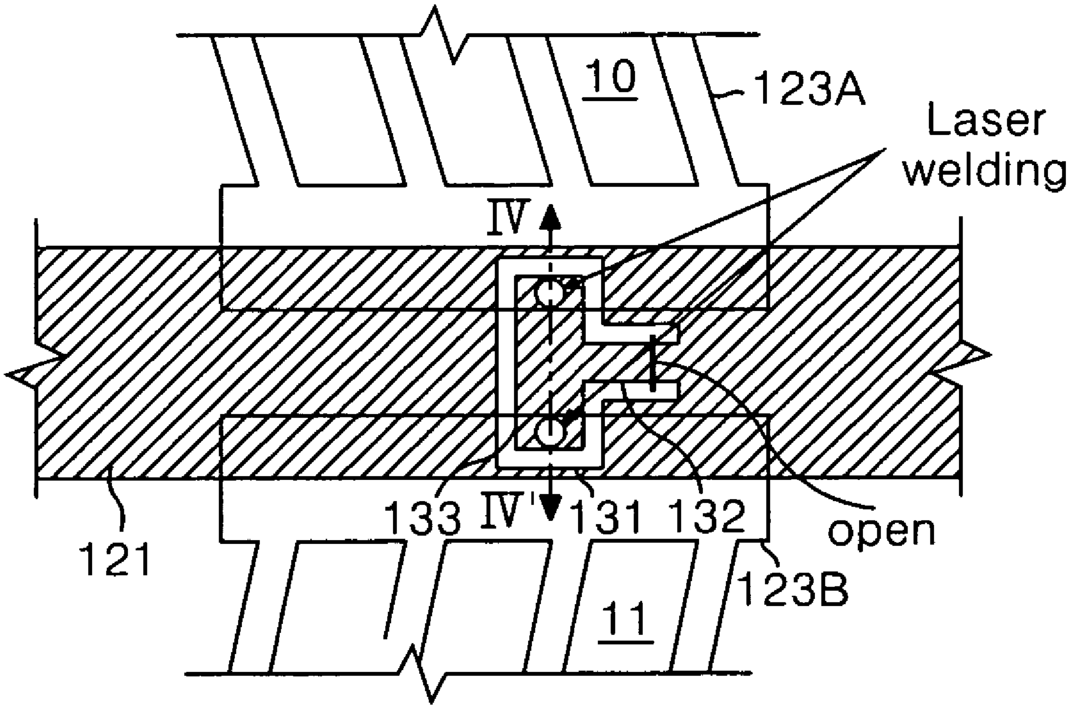
FIG. 12 is a plan view that shows a defective pixel and a normal pixel that have the same color and are adjacent in order to explain a repairing process according to a fourth embodiment.
Figure 13:
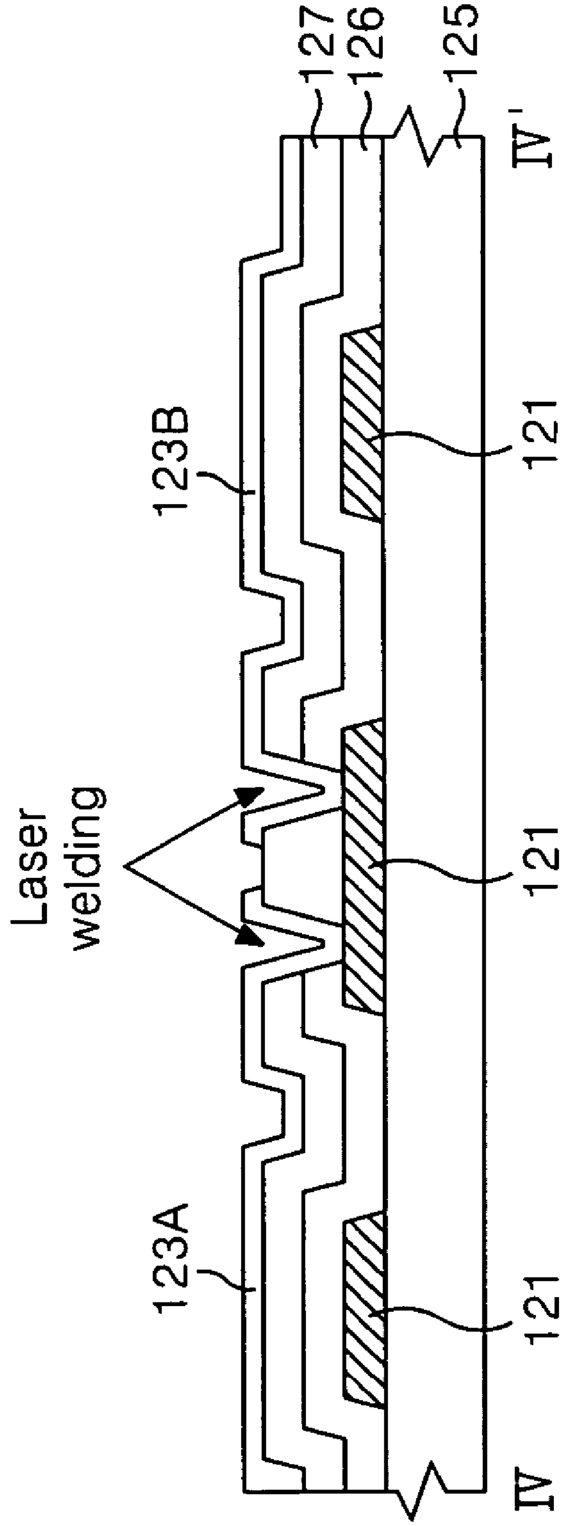
FIG. 13 is a sectional view that shows a defective pixel and a normal pixel that have the same color and are adjacent taken along the IV-IV' lines in FIG. 12 after the repairing process.

FIG. 12 and FIG. 13 are diagrams that explain a repairing process of an IPS mode liquid crystal display device according to the fourth embodiment of the present invention. The data metal pattern such as the data line the TFT and the common electrode that apply the horizontal electric field to the liquid crystal cells along with the pixel electrode will be omitted in FIG. 12 and FIG. 13.

Referring to FIG. 12 and FIG. 13, a gate line 121 of the liquid crystal display according to the present invention includes a neck 132, a head 133 connected to the neck 132 and amplified an area, and an aperture pattern 131 removed in a 'C' type near the neck 132 and the head 133.

A gate metal pattern that includes the gate line 121, the gate electrode (not shown) of the TFT and a common electrode is formed on the glass substrate 125 by the gate metal deposition process, the photolithography process and the etching process.

The pixel electrodes 123A and 123B are formed on the protective film 127 by a process that disposes the transparent conductive metal, the photolithography process and the etching process.

In the gate line 121, the neck 131 is opened by the laser cutting process in the repairing process. An edge of the head 133 is overlapped with the pixel electrode 123A of the defective pixel 10 with having the gate insulating film 126 and the protective film 127 therebetween. Another edge of the head 133 is overlapped with the pixel electrode 123B of the normal pixel 11 adjacent to the defective pixel 10 with having the gate insulating film 126 and the protective film 127 therebetween.

The repairing process is carried out on the lower substrate before the substrate joining/liquid crystal injecting process or on a panel after the substrate joining/liquid crystal injecting process. A current path between the source electrode of the TFT and the data line or a current path between the drain electrode of the TFT and the pixel electrode 123A is opened by a laser cutting process in order to shield a current path between the TFT of the defective pixel and the pixel electrode 123A, and the neck 132 of the gate line 121 is opened.

Figure 14:
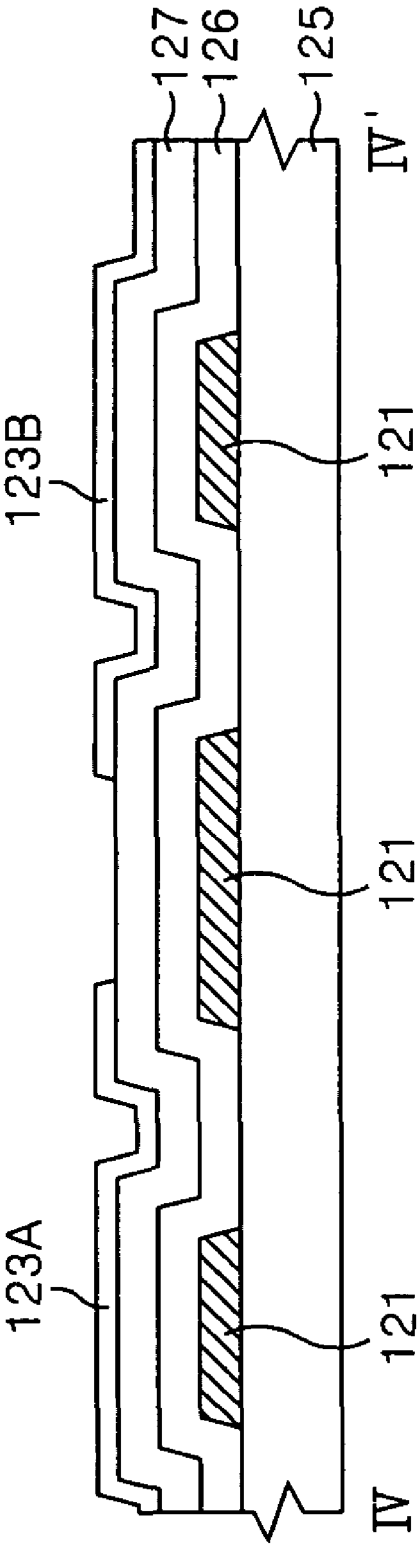
FIG. 14 is a sectional view that shows a defective pixel and a normal pixel that have the same color and are adjacent taken along the IV-IV' lines in FIG. 12 before the repairing process.

The repairing process radiates a laser into the pixel electrodes 123A and 123B adjacently with each other at both edges of the head 133 shown in FIG. 13. The pixel electrodes 123A and 123B, the protective film 127 and the gate insulating film 126 are melted by the laser beam. As a result, the head 133 becomes an independence pattern to be separated with the gate line 121, so that the pixel electrodes 103A and 103B are connected to the head 133. A procedure of an opening process and a laser welding process may be changed. FIG. 14 shows the pixel electrodes 123A and 123B electrically separated by the protective film 127 and the gate insulating film 126 before the laser welding process, and the head 133.

The repairing process according to the fourth embodiment of the present invention removes the neck 133 in a patterning process of the gate line 121 to form in the independence pattern the link pattern 74 shown in FIG. 7, so that it becomes possible to remove the cutting process of the neck 133 in the repairing process.

The link pattern 74 in FIG. 7, the head 133 in FIG. 12, the neck 132 and the aperture pattern 131 may be formed one number per each pixel like the above-mentioned embodiments, or may be form multiple numbers per each pixel in order to reduce an electric contact characteristics of the link pixels, for example, a contact resistance.

The repairing process of the above-mentioned embodiments primarily describes the active matrix liquid crystal display, but the repairing process can be similarly adjusted in another flat panel display device like an active matrix organic light emitting diode OLED.

Figure 15:
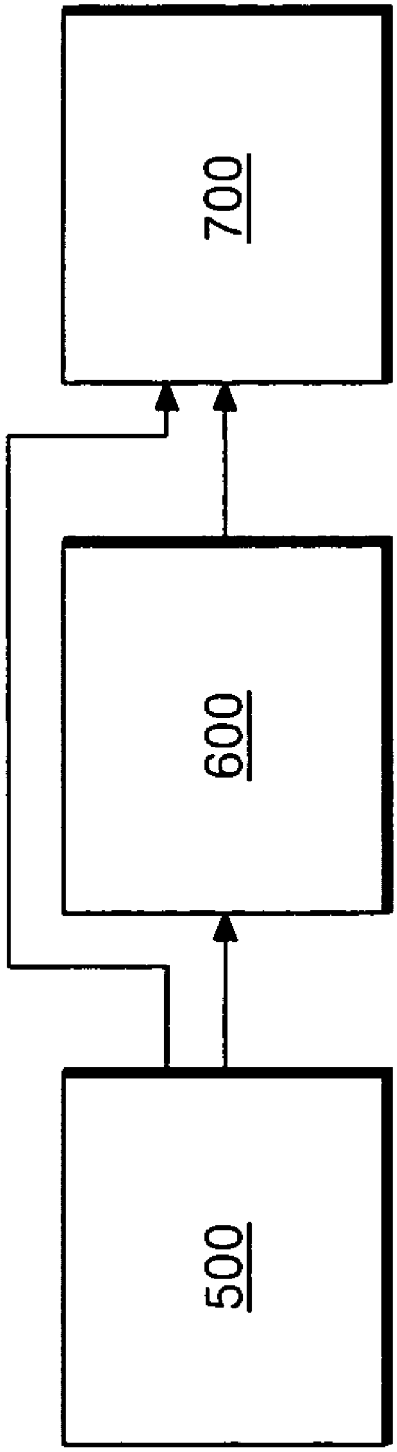
FIG. 15 is a block diagram that schematically shows a fabricating apparatus of a flat panel display according to the embodiment.

FIG. 15 shows a fabricating apparatus of a flat panel display according to the embodiment of the present invention.

Referring to FIG. 15, the fabricating apparatus of the flat panel display includes an inspection device 500, a repair device 600 and an electric charging compensation device 700.

The inspection device 500 includes a light measuring device, a camera device or a microscope device, a coordinate calculating device, and inspects an existence or nonexistence of the defective pixels 11.

The repair device 600 includes the laser cutting means, the W-CVD means or the laser cutting means and the laser welding means, and electrically connects the defective pixel 10 to the normal pixel 11 having the same color adjacently with thereof to form the link pixel 13.

The electric charging compensation device 700 determines a charging compensation data that compensates an insufficient charging characteristics of a link pixel 130 using a memory, for example, a host computer, a ROM recorder, the EEPROM or the EDID ROM, in accordance with a result of the inspection device 200 and stores the data into the memory. The memory stores the charging compensation data included in a drive circuit of a display.

Figure 16:
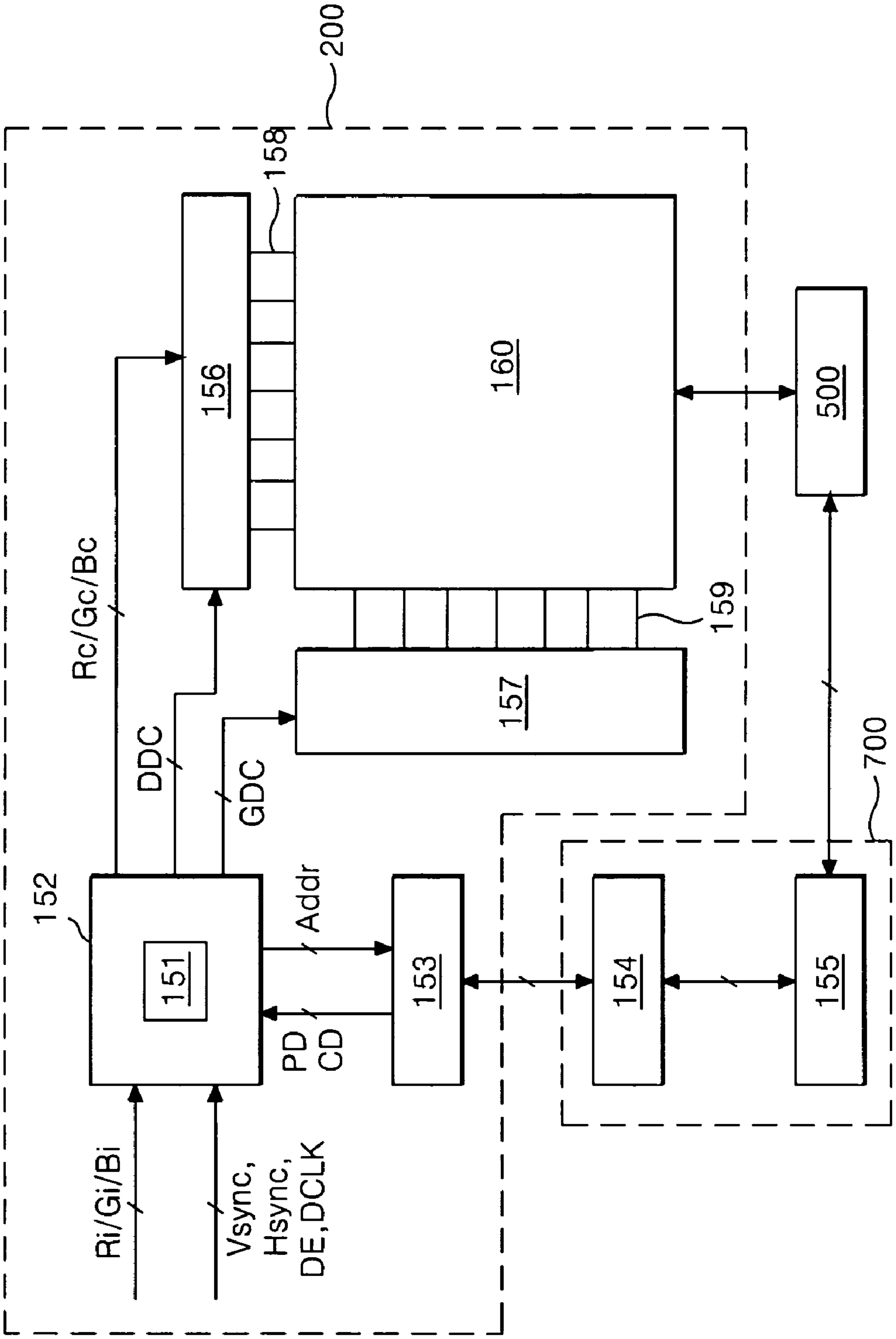
FIG. 16 is a block diagram that shows a flat panel display, an inspection device and an electric charging compensation device.

FIG. 16 shows the flat panel display 200, the inspection device 500 and the electric charging compensation device 700.

Referring to FIG. 15, the flat panel display 200 according to the embodiment includes a flat panel display panel 160 with data lines 158 and scan lines 159 that cross each other and the pixels are arranged in a matrix type. A data drive circuit 156 supplies a digital video data Rc/Gc/Bc compensated a charging characteristics of the link pixel 13 to the data lines 158. A scan driver circuit 157 that sequentially supplies a scan pulse to the scan lines 159. A timing controller 152 controls the drive circuits 156 and 157. An EEPROM 153 or an EDID ROM. The flat panel display 200 is implemented in a liquid crystal display device LCD and the organic light emitting diode OLED. If the defective pixel 10 is included in the flat panel display 200, the defective pixel 10 and the normal pixel 11 having the same color adjacently with thereof are electrically connected to each other in the repairing process.

A compensation circuit 151 that compensates the charging characteristics of the link pixel 13 on the basis of a location data stored in the EEPROM 153 and the charging compensation data is embedded into the timing controller 152. The compensation circuit 151 varies the compensation data at an input digital video data Ri/Gi/Bi corresponding to a location of the link pixel 13 to modulate the digital video data. The compensation circuit 151 will be described in detail later.

The timing controller 152 supplies the digital video data Ri/Gi/Bi of the defective pixel 10 that is modulated by the compensation circuit 151 and the digital video data Ri/Gi/Bi of the normal pixels 11 that are not to be modulated to the data drive circuit 156. The timing controller 152 generates a data drive control signal DDC that controls the operation timing of the data drive circuit 156 and a gate drive control signal GDC that controls the operation timing of the gate drive circuit 157 by use of vertical and horizontal synchronization signals Vsync, Hsync, a dot clock DCLK and a data enable signal DE.

The data drive circuit 156 converts the digital video data Rc/Gc/Bc from the timing controller 152 into an analog voltage or current which can express a gray scale level, and supplies to the data lines 158.

The scan drive circuit 157 sequentially applies a scan pulse to the scan lines under control of the timing controller 152 to select a horizontal line of pixels that are to be displayed.

The EEPROM 153 stores a location data of the normal pixel 11 included in the link pixel 13 determined in the electric charging compensation process and the charging compensation data, and is integrated on the printed circuit board PCB of the flat panel display 200 along with the timing controller 152 to supply the location data of the normal pixel 11 included in the link pixel 13 and the charging compensation data to the compensation circuit 153 within the timing controller 152 upon a normal driving of the flat panel display 200.

The inspection device 500 supplies test data to the data lines 158 and test scan pulses to the scan lines 159 to inspect a picture displayed in the flat panel display device in a state that the drive circuits are not connected to the flat panel display panel 160. The inspection device 500 inspects the test picture displayed on the flat panel display panel 160 under control of the computer 155, while increasing the gray scale level of the test data by gray scale levels from the lowest gray scale level (or peak black gray scale level) to the highest gray scale level (or peak white gray scale level). The test data should have a resolution of at least not less than 8 bits.

The electric charging compensation device 700 includes a ROM recorder 154 that may be connected to the EEPROM 153 and a computer 155 connected to the ROM recorder 154.

The computer 155 receives a brightness measuring value of pixels for each gray scale level that are measured by the inspection device 500 to prove the existence or nonexistence of the defective pixel 10 and determines the charging compensation data for compensating the location data of the normal pixel 11 included in the link pixel 13 and the insufficient charging characteristics of the link pixel 13 on the flat panel display panel 160, which the defective pixel 10 and the normal pixel 11 are electrically connected to each other in the repairing process. The computer 155 supplies the location data and the charging compensation data to the ROM recorder 154. The computer 155 allows the ROM recorder 154 to renew the location data and the charging compensation data stored at the EEPROM 153 or the EDID ROM by transmitting the renewal data to the ROM recorder 154 by using a communication standard protocol such as I2C in the case that the renewal of the location data and the charging compensation data is needed because of reasons such the change of process condition and the difference between applied models or if renewal data of the location data and the charging compensation data are inputted by an operator.

The ROM recorder 154 supplies the location data and the charging compensation data from the computer 155 to the EEPROM 153. The ROM recorder 154 can transmit the location data and the charging compensation data to the EEPROM 153 through a user connector. The location data and the charging compensation data is transmitted in series through the user connector, and a serial clock, a ground power are transmitted to the EEPROM 153 though the user connector.

The location data and the charging compensation data are transmitted to the EDID ROM instead of the EEPROM 153 and the user connector, and the EDID ROM can store the location data and the charging compensation data to a separate storage space. The EDID ROM stores seller/manufacturer identification information ID and the variables and characteristics of a basic display device as monitor information data other than the location data and the charging compensation data. The charging compensation data is transmitted to the EDID ROM instead of the EEPROM 153. When using the EDID ROM, the EEPROM 153 and the user connector might be removed, thus there is an effect of reducing an additional development cost as much. Hereinafter, it will be described assuming that the memory at which the location data and the charging compensation data are stored is the EEPROM 153. The EEPROM 153 can be replaced with the EDID ROM in the following explanation of the embodiment.

Figure 17:
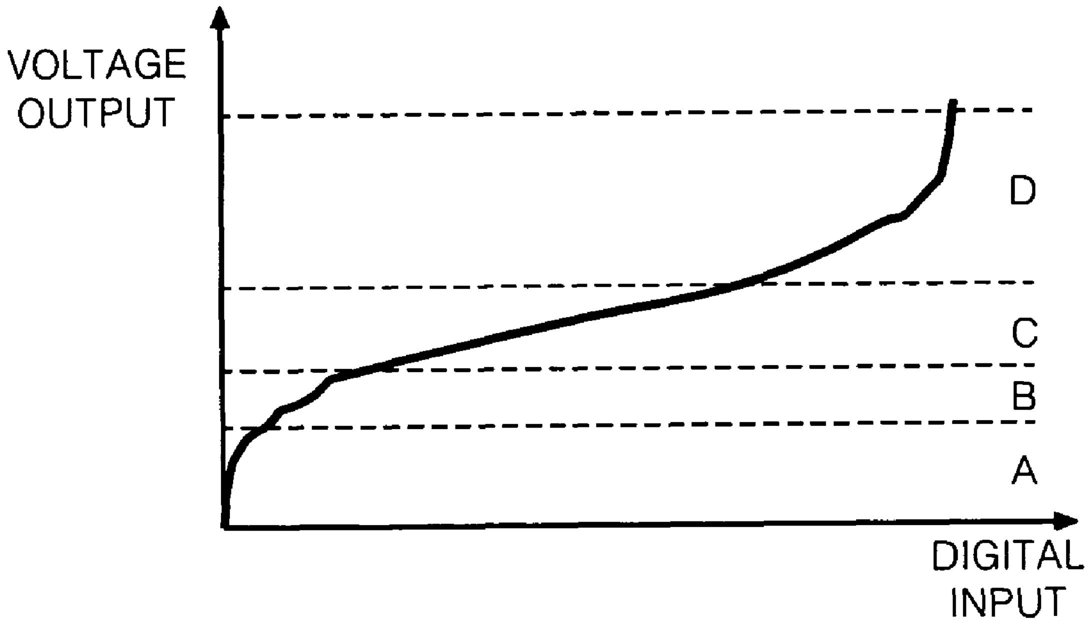
FIG. 17 is a diagram that shows a gamma compensation curve of an example in which a charging compensation data is set in such a manner that divides into each gray scale level and each gray scale section.

The charging compensation data stored at the EEPROM 153 should be optimized for each link pixel 13, for example, each gray scale level in consideration of gamma characteristic as in FIG. 17, to be profitable. The charging compensation data can be set for each gray scale level in each of R, G and B, or can be set for each gray scale level section (A, B, C and D) inclusive of a plurality of gray scale levels in FIG. 17. For example, the charging compensation data can be set as an optimized value each gray scale level section, for example, '0' in a 'gray scale level section A', '0' in a 'gray scale level section B', '1' in a 'gray scale level section C' and '1' in a 'gray scale level section D'. The charging compensation data can be made to be different for the link pixel, and may be different for gray scale level or for gray scale level section. The EEPROM 153 stores the location data and the charging compensation data and a gray level area information (sections A, B, C and D in FIG. 17) in a form of lookup table, and supplies the location data and the charging compensation data from the corresponding address to the compensation circuit 151 in response to an address control signal from the compensation circuit 151 that is embedded in the timing controller 152.

Figure 18:
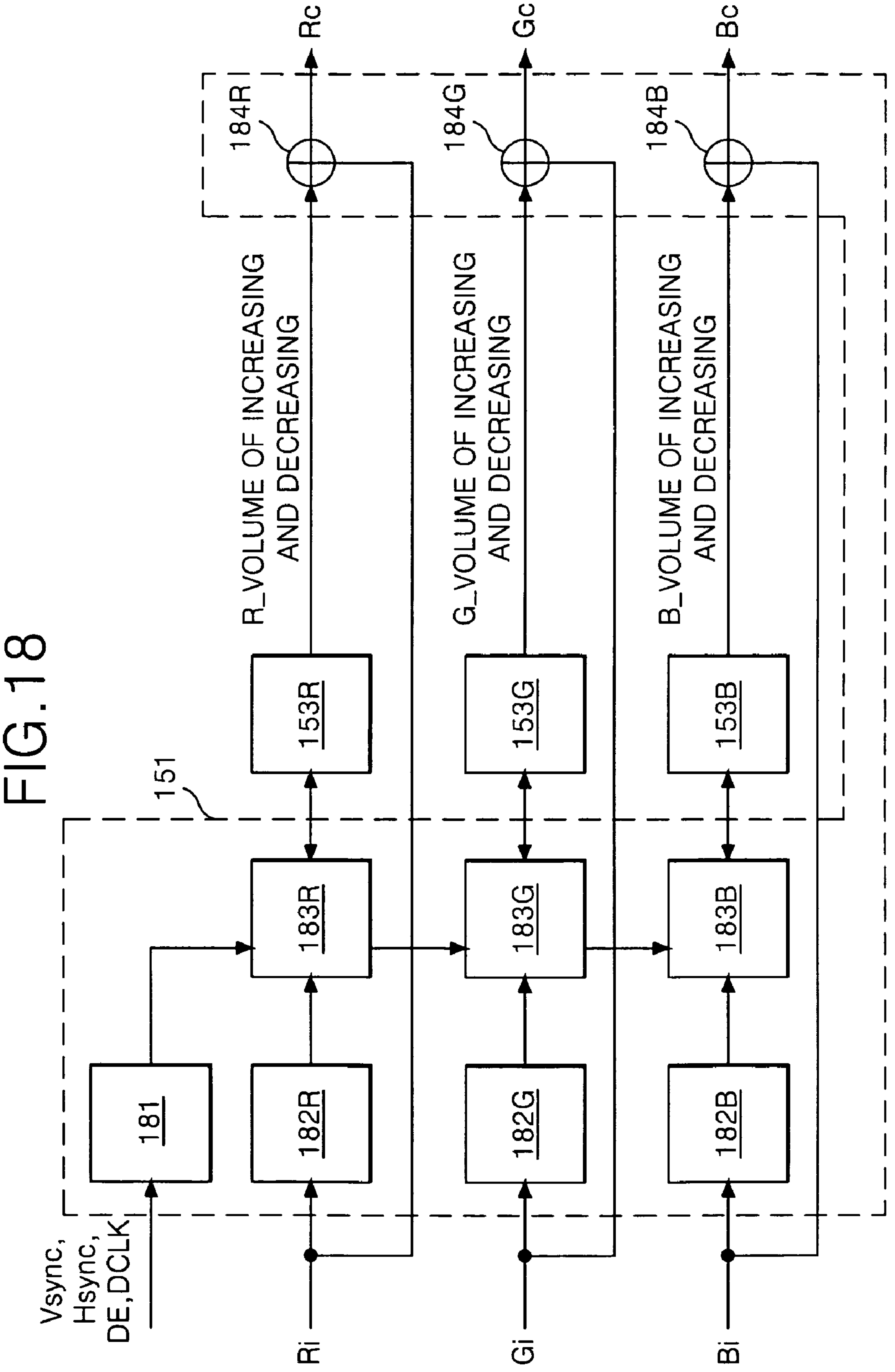
FIG. 18 is a block diagram that shows a compensation circuit according to the embodiment.
Figure 19:
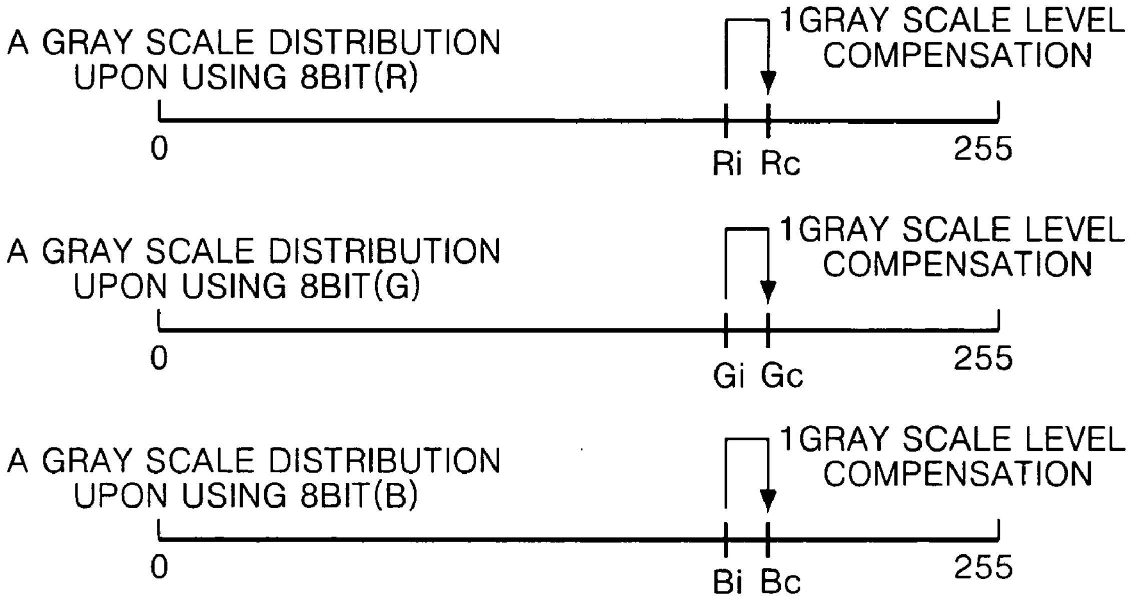
FIG. 19 and FIG. 20 are diagrams that show charging compensation examples of the compensation circuit shown in FIG. 16.
Figure 20:
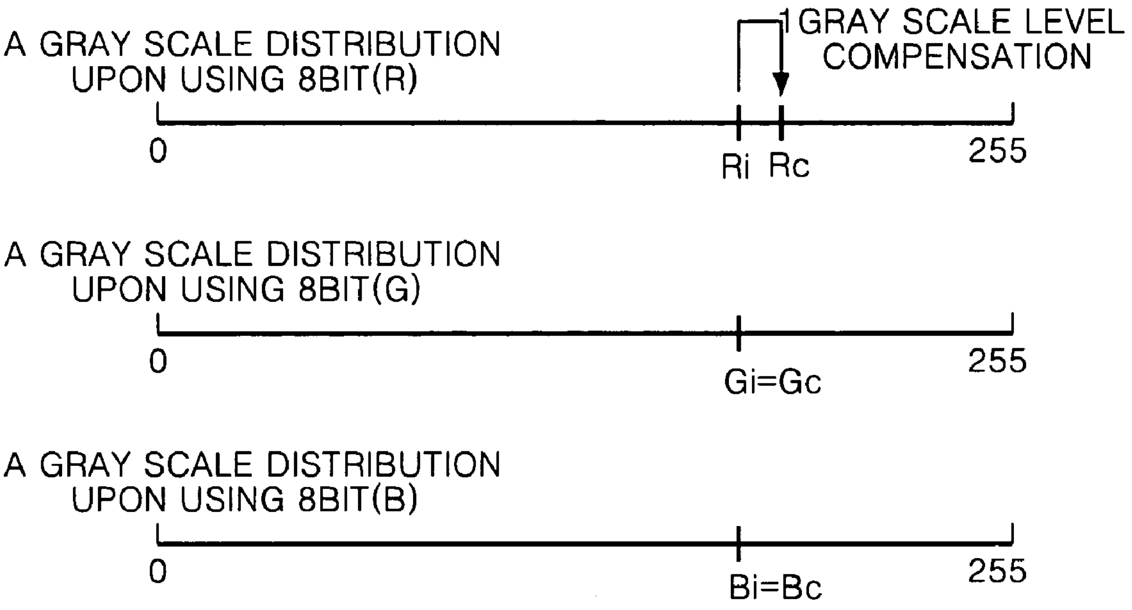

FIG. 18 to FIG. 20 are diagrams that explain a specific circuit configuration of the compensation circuit 151 and an operation thereof.

Referring to FIG. 18, the compensation circuit 151 includes a location judging portion 181, a gray scale level judging portion 182R, 182G and 182B, an address generator 183R, 183G and 183B, and a calculator 184R, 184G and 184B.

And the EEPROM 153 includes first to third EEPROM 153R, 153G and 153B of which each stores the location data and the charging compensation data of the link pixel 13 for each of red R, green G and blue B.

The location judging portion 181 judges the display location of the input digital video data Ri/Gi/Bi by using the vertical/horizontal synchronization signals Vsync, Hsync, the data enable signal DE and the dot clock DCLK.

The gray scale level judging portion 182R, 182G, 182B analyzes the gray scale level of the input digital video data Ri/Gi/Bi of red R, green G and blue B.

The address generator 183R, 183G and 183B generates a read address that reads the charging compensation data of the location to supply to the EEPROM 153R, 153G and 153B if the display location of the input digital video data Ri/Gi/Bi corresponds to the normal pixel 11 included in the link pixel 13 by referring to the location data of the EEPROM 153R, 153G and 153B.

The charging compensation data outputted from the EEPROM 153R, 153G, 153B in accordance with the address are supplied to the calculator 184R, 184G, 184B.

The calculator 184R, 184G and 184B adds the charging compensation data to or subtracts the charging compensation data from the input digital video data Ri/Gi/Bi to modulate the input digital video data Ri/Gi/Bi that is to be displayed in the normal pixel 11 of the link pixel 13. The calculator 184R, 184G and 184B might include a multiplier or a divider which might multiply the charging compensation data to or divide the charging compensation data from the input digital video data Ri/Gi/Bi other than an adder and a subtractor.

One example of the charging compensation result by the compensation circuit 151 is that the red link pixel 13, the green link pixel 13 and the blue link pixel 13 exist at the flat panel display panel 160, and if a degree of the insufficient charging characteristics is the same in the specific gray scale level, then the R compensation data, the G compensation data and the B compensation data are identically set to be '1', and a digital gray scale value in comparison to the input digital video data Ri/Gi/Bi to be displayed at the non-linked normal pixel 11 location, is increased by one identically in the link pixel of each color. Thus, the brightness of the link pixel can be compensated, as shown in FIG. 19. Another example of the charging compensation result by the compensation circuit 151 is that if only the red link pixel 13 exists in the flat panel display panel 160, then the R compensation data is set to be '1' and the G compensation data and B compensation data are set to be '0' shown in FIG. 20.

Referring to FIG. 18 to FIG. 20, a "Rc" is a modulation data to be displayed at the red link pixel 13, a "Gc" is a modulation data to be displayed at the green link pixel 13 and a "Bc" is a modulation data to be displayed at the blue link pixel 13.

As described above, in the method and apparatus for fabricating the flat panel display, the defective pixel is electrically connected to the normal pixel having the same color adjacently with thereof to form the link pixel. The digital video data to be displayed at the link pixel is modulated by the set compensation data to compensate the charging characteristics of the link pixel. Thus, the recognizing degree of the defective pixel is reduced, so that it becomes possible to electrically compensate charging characteristics of the link pixel including the defective pixel.

In the flat panel display, the method that controls a picture quality thereof and the apparatus, the charging characteristics of the defective pixel is detail compensated by using the compensation data stored at the memory by the method of fabricating and the apparatus to reduce the recognizing degree of the defective pixel. Thus, a defective proportion is reduced, so that it becomes possible to improve a display quality.

Although the embodiments have been described and shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A flat panel display, comprising:

a display panel that includes a plurality of data lines and a plurality of scan lines that cross each other;

a plurality of pixels, wherein a defective pixel is electrically connected to a normal pixel that is adjacent;

a plurality of switch devices formed at an area defined by an intersection between the data lines and the scan lines to supply a data signal from the data line to pixels that includes the link pixel;

a memory that stores a location data that indicates a location of a link pixel and a compensation data that compensates for a charging characteristics of the link pixel; and a compensation circuit that modulates a input digital video data to be displayed on the link pixel on the basis of the location data and the compensation data, wherein the link pixel includes the normal pixel adjacently with the defective pixel, the normal pixel displays the same color as a color displayed by the defective pixel, wherein the compensation circuit compensates a charging characteristics of the link pixel on the basis of the location data stored in the memory, the compensation circuit varies a compensation data at the input digital video data corresponding to the location of the link pixel to modulate the input digital video data, wherein the compensation circuit includes a location judging part, a gray scale level judging part, an address generator and a calculator, wherein the calculator includes a multiplier or a divider which multiplies the charge compensation data to or divides the charging compensation data from the input digital video data other than an adder and a subtractor, wherein the link pixel further includes a link pattern that overlaps with a first pixel electrode of the defective pixel and a second pixel electrode of the normal pixel adjacently with thereof with having a protective film therebetween, wherein the link pattern is disposed on a pixel electrode of the defective pixel and a pixel electrode of the normal pixel having the same color adjacently with thereof, wherein both edges of the link pattern overlap with the pixel electrodes of the defective and normal pixels adjacently in the vertical direction to directly connect to the pixel electrodes of the defective and normal pixels in a laser welding process, and wherein the first and second pixel electrodes include an extending portion extended from the edge of an upper portion, and overlap with an edge of the link pattern by the extending portion.

2. The flat panel display as claimed in claim 1, wherein the location judging part judges the location of the input digital video data by using a synchronization signals, a data enable signal and a dot clock, wherein the gray scale level judging part analyzes the gray scale level of the input digital video data, wherein the address generator generates a read address that reads a charging compensation data of the location to supply to the memory if the location of the input digital video data corresponds to the normal pixel included in the link pixel by referring to the location data of the memory, wherein the calculator adds the charging compensation data to or subtracts the charging compensation data from the input digital video data to modulate the input digital video data that is to be displayed in the normal pixel of the link pixel.

3. The flat panel display as claimed in claim 2, wherein the compensation data is set in accordance with the gray scale of a data to be displayed at the link pixel.

4. The flat panel display as claimed in claim 1, wherein a current path between the defective pixel and the switch device is shorted.

5. The flat panel display as claimed in claim 1, further comprising:

a data drive circuit that converts a digital video data modulated by the compensation circuit and a un-modulated digital video data into an analog data signal to supply to the data lines;

a scan drive circuit that supplies a scan signal to the scan lines;

the data drive circuit that supplies the digital video data to the data drive circuit; and a timing controller controls the scan drive circuit.

6. The flat panel display as claimed in claim 5, wherein the compensation circuit is integrated within the timing controller.

7. The flat panel display as claimed in claim 1, wherein the memory includes EEPROM.

8. The flat panel display as claimed in claim 1, wherein the compensation circuit increases and decreases the compensation data into the input digital video data to be displayed at the link pixel.

9. The flat panel display as claimed in claim 1, wherein said display panel is either a display panel of a liquid crystal display device or a display panel of an organic light emitting diode.

10. The flat panel display as claimed in claim 1, wherein said memory includes EDID ROM.

* * * * *